(12) United States Patent
Yang et al.

(10) Patent No.: US 7,371,079 B2
(45) Date of Patent: May 13, 2008

(54) ELECTRICAL CARD CONNECTOR

(75) Inventors: Gong-Qing Yang, ShenZhen (CN); Chang-Shin Hsu, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/638,806

(22) Filed: Dec. 14, 2006

(65) Prior Publication Data
US 2007/0134989 A1 Jun. 14, 2007

(30) Foreign Application Priority Data
Dec. 14, 2005 (CN) .................. 2005 1 0123178

(51) Int. Cl.
*H01R 12/00* (2006.01)
(52) U.S. Cl. ........................ 439/74; 439/630
(58) Field of Classification Search .............. 439/74, 439/76.1, 630, 326, 341
See application file for complete search history.

(56) References Cited

U.S. PATENT DOCUMENTS

| 5,879,169 | A | | 3/1999 | Wu | |
|---|---|---|---|---|---|
| 6,024,593 | A | * | 2/2000 | Hyland | 439/326 |
| 6,149,466 | A | * | 11/2000 | Bricaud et al. | 439/630 |
| 6,241,545 | B1 | * | 6/2001 | Bricaud et al. | 439/326 |
| 6,761,575 | B2 | * | 7/2004 | Bricaud et al. | 439/326 |
| 6,802,448 | B2 | * | 10/2004 | Bricaud et al. | 235/451 |
| 6,869,302 | B2 | * | 3/2005 | Bricaud et al. | 439/326 |
| 7,029,306 | B2 | * | 4/2006 | Bilcauu et al. | 439/326 |

* cited by examiner

*Primary Examiner*—Neil Abrams
*Assistant Examiner*—Phuongchi Nguyen
(74) *Attorney, Agent, or Firm*—Wei Te Chung

(57) ABSTRACT

An electrical card connector includes an insulating housing having a plurality of passageways and a plurality of contacts received in the insulating housing. Said insulating housing has a plurality of bars near two sides of each passageway for restricting each said contact vertically. Each bar has a barb on an inner side thereof so that the contact can be retained in the insulating housing firmly to prevent the contact from dropping out from the insulating housing.

10 Claims, 4 Drawing Sheets

US 7,371,079 B2

ELECTRICAL CARD CONNECTOR

BACKGROUND OF THE INVENTION

1. Field of the invention

The present invention relates to an electrical card connector, and more particularly to an electrical card connector having a plurality of contacts firmly assembled into an insulating housing.

2. Description of Related Art

SIM ("Subscriber Identity Module") card connector is widely used in mobile electrical devices, such as mobile telephone which can receive a SIM card, for electrically connecting the SIM card to a printed circuit board in the mobile phone.

U.S. Pat. No. 5,879,169 discloses an electrical card connector including an insulating housing and a plurality of contacts retained in a plurality of corresponding receiving passageways defined on the insulating housing. Each contact has a vertical base portion, a connecting portion and a soldering portion. The contact is upwardly assembled into said receiving passageway from a bottom surface of the insulating housing and retained in the insulating housing in vertical direction in manner of an interferential engagement between two sides of the base portion and inner sidewalls of the receiving passageway. However, the interferential force between the base portion and the insulating housing is not strong enough to retain the contact firmly, the contact is easy to drop out from the insulating housing when there is a heavy shock or an external impact acted on the contact before the contact is soldered on a printed circuit board, which brings a bad influence on the process of manufacturing. So it is necessary to provide a new electrical card connector to solve the problems above.

SUMMARY OF THE INVENTION

Accordingly, it is an object of the present invention to provide an electrical card connector in which the contacts are firmly assembled into the insulating housing.

In order to achieve above-mentioned object, an electrical card connector is provided which comprises an insulating housing and a plurality of contacts assembled to the insulating housing from bottom to top. The insulating housing has a top surface, a bottom surface and a plurality of passageways running through the top surface and the bottom surface. Each contact has a mating portion extending upwardly beyond the top surface through the corresponding passageway, a soldering portion for being soldered to a printed circuit board and a horizontal portion. The insulating housing is formed with a plurality of bars downwardly protruding from the bottom surface thereof to hold at least one side of the horizontal portion of the contact.

Other objects, advantages and novel features of the present invention will become more apparent from the following detailed description of the present embodiment when taken in conjunction with the accompanying drawings.

DETAILED DESCRIPTION OF THE INVENTION

The present invention shall be discussed hereinafter in terms of a preferred embodiment illustrated in the accompanying drawings. In the following description, numerous specific details are set forth in order for the reader hereof to gain a thorough understanding of the present invention. It will be obvious, however, to those skilled in the art that certain well-know elements may not be shown in detail in order to unnecessarily obscure the present invention.

Figure 1:
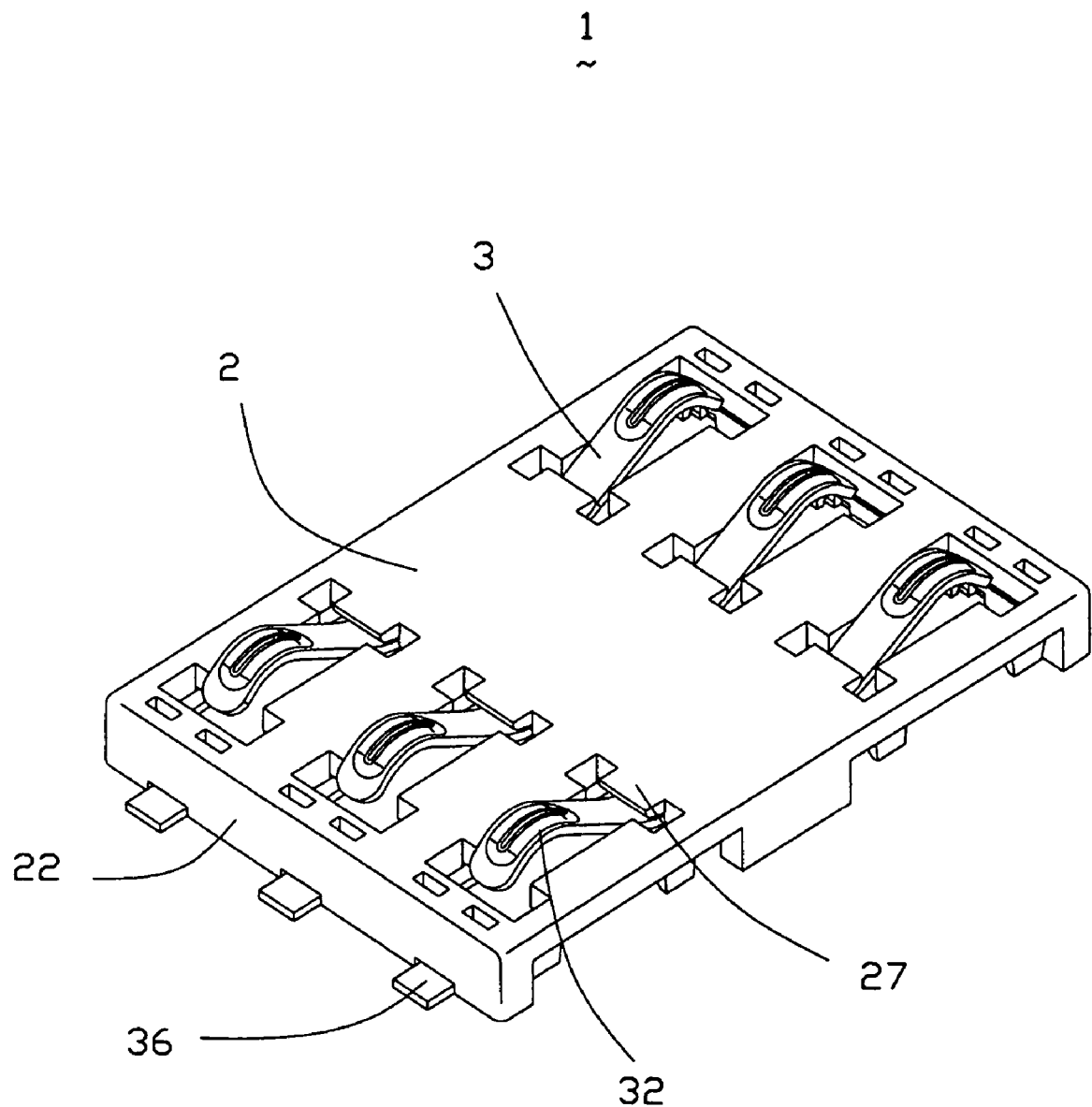
FIG. 1 is an assembled, perspective view of the electrical card connector in accordance with the present invention.

Referring to FIG. 1, an electrical card connector 1 in accordance with the present invention is provided for receiving an electrical card. The electrical card connector 1 comprises an insulating housing 2 and a plurality of contacts 3 retained in the insulating housing 2.

Figure 2:
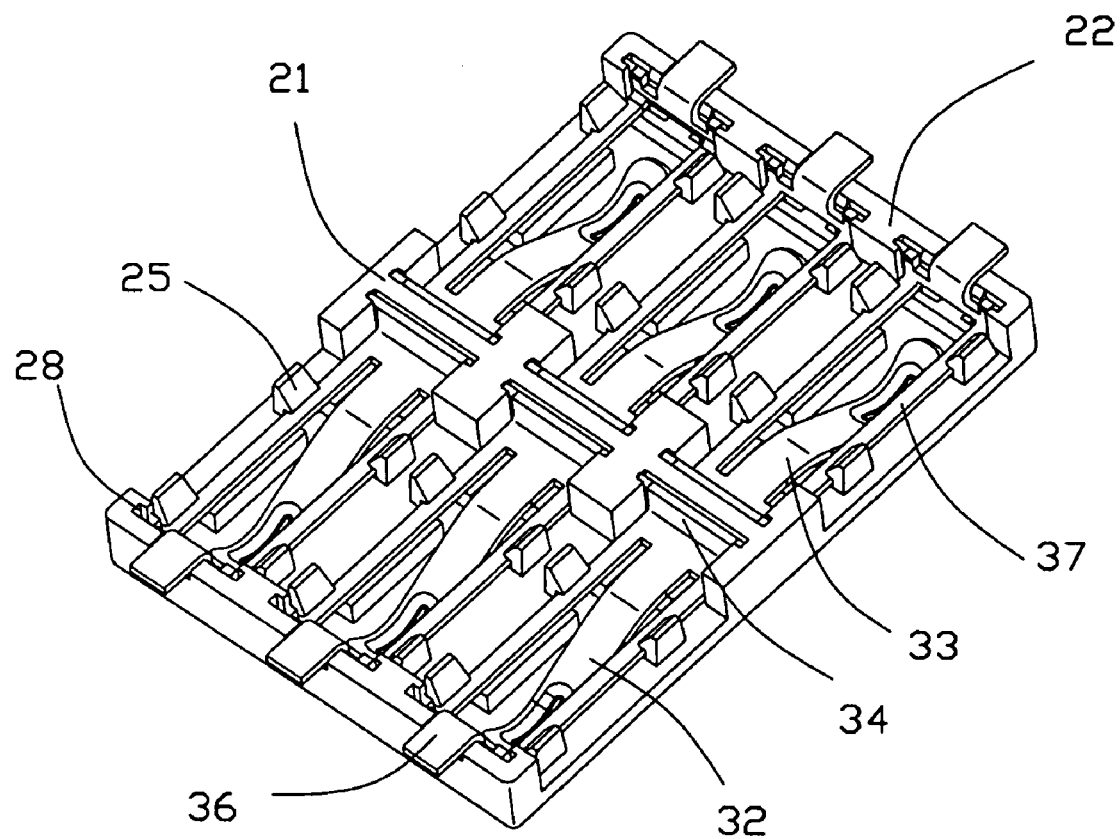
FIG. 2 is an another assembled, perspective view of the electrical card connector, taken from a bottom side in accordance with the present invention.
Figure 3:
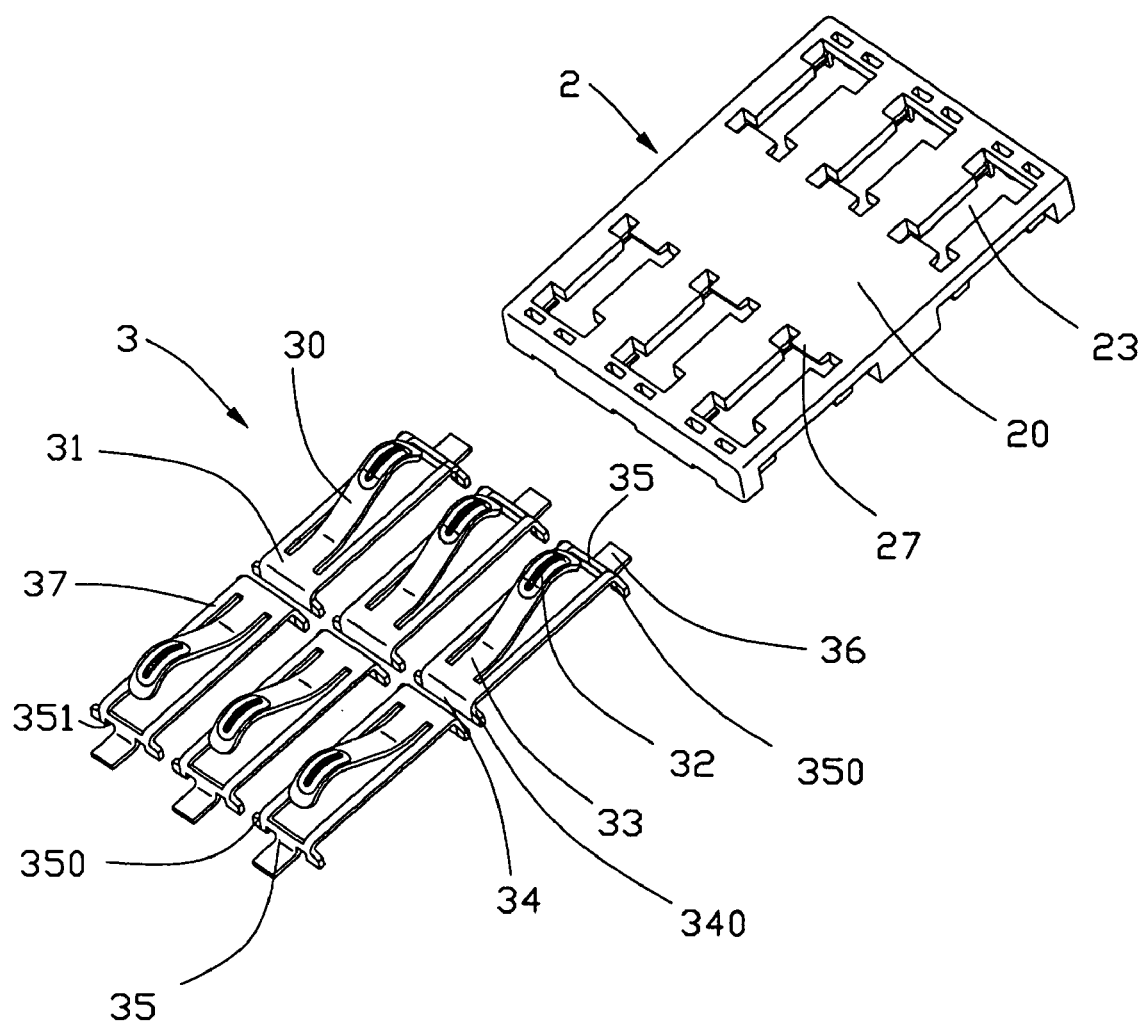
FIG. 3 is an exploded, perspective view of the electrical card connector in accordance with the present invention.
Figure 4:
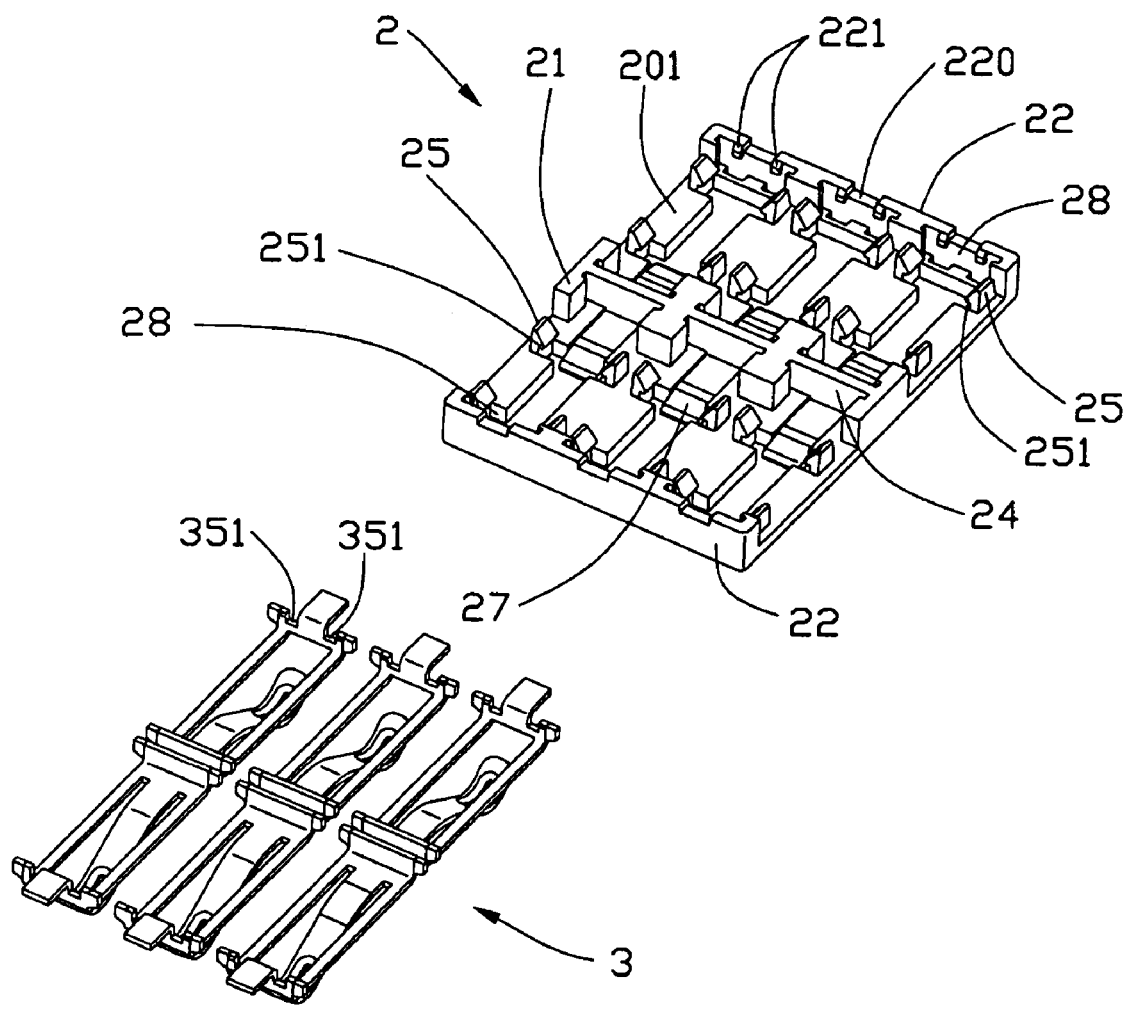
FIG. 4 is an another exploded view of the electrical card connector, taken from a bottom side in accordance with the present invention.

Referring to FIGS. 2-4, each contact 3 comprises an approximate rectangular base portion, a soldering portion 36 extending from a lateral end of the base portion and a spring portion 30 for mating with the electrical card. Said base portion has a first engaging portion 34 and a second engaging portion 35 bended from two opposed lateral ends thereof. Said base portion 34 has a planar portion 31 near the first engaging portion 34. Each of the first engaging portion 34 and the second engaging portion 35 have a vertical portion and two projections 340, 350 respectively projecting from a front and a rear sides of the vertical portion and beyond the base portion. Said vertical portion of the second engaging portion 35 has at least one notch 351 formed on a bottom edge thereof for engaging with the insulating housing 2. The spring portion 30 is a spring arm punched from a center part of the base portion with an end near the first engaging portion 34 linking with the planar portion 31 and the other end extending upwardly and laterally toward the second engaging portion 35. So that the base portion defines a hollow in the center part, and also has two horizontal portions 37 in a front and a rear sides of the hollow. Said two horizontal portions 37 extend in two parallel lines. The spring portion 30 comprises a connecting portion 33 linking with the planar portion 31 and a mating portion 32 extending from the connecting portion 33 toward the second engaging portion 35 with a free end. The soldering portion 36 extends horizontally from the bottom edge of the vertical portion of the second engaging portion 35 and is soldered on a printed circuit board by SMT ("Surface Mounted Technology"). Said soldering portion 36 is adjacent to the notch 351. However, said spring portion 30 can also be formed by another way, such as setting the connecting portion 33 near the second engaging portion 35 to make the spring portion 30 extend from the second engaging portion 35 to the first engaging portion 34.

The insulating housing 2 is a rectangular plank which has a top surface 20 and a bottom surface 201. The insulating housing 2 has three parallel barriers 22, 21 respectively on two lateral ends and a center part of the insulating housing 2, which are protruding from the bottom surface 201 of the insulating housing 2. The insulating housing 2 defines two symmetrical rows of receiving concaves arranged on two lateral sides of the barrier 21 for receiving the contacts 3. Each receiving concave has a passageway 23 running through the insulating housing 2 from the top surface 20 to the bottom surface 201. The barrier 21 disposed in the center of the insulating housing 2 defines a plurality of slots 24 on two sidewalls thereof for receiving the first engaging portions 34 of the contacts 3, the barriers 22 disposed on the two lateral ends have a plurality of slots 28 on inner sidewalls thereof for receiving the second engaging portions 35 of the contacts 3. In fact, the insulating housing 2 defines one slot 24 and one slot 28 corresponding to two ends of each receiving concave to receive the first and the second engaging portions 34, 35. Said barrier 22 further has a plurality of gaps 220, each gap 220 is corresponding to a corresponding slot 28 and is recessed from a bottom face of the barrier thereof for receiving a corresponding soldering portion 36. A plurality of protrusions 221 are disposed on a bottom edge of the barrier 22 and are exposed in the slots 28 for engaging with the notches 351 of the contacts 3. The insulating housing 2 is formed with a plurality of bars 25, 26 arranged in a front and a rear sides of each corresponding passageway 23. Each bar 25 has a barb 251 on one side thereof protruding toward corresponding passageway 23 for restricting the contact 3. The insulating housing 2 has a plurality of sustainers 27, each of which is disposed between the corresponding passageway 23 and the barrier 21 and upon the receiving concave for covering a part of the contact 3.

As the contact 3 is pressed and assembled into the receiving concave from the bottom surface 201 of the insulating housing 2, said first and second engaging portions 34, 35 are respectively received into the corresponding slots 24, 28. The horizontal portions 37 of each contact 3 are disposed on the bottom surface 201 of the insulating housing 2 and near the two sides of the passageway 23. The barbs 251 of the bars 25 besides the passageway 23 hold one side of the corresponding horizontal portions 37 to prevent the contact 3 from dropping. The notches 351 of the second engaging portion 35 are engaged with the protrusions 221 vertically. The mating portion 32 extends out the top surface 20 through the passageway 23 to contact with the electrical card. Said soldering portion 36 of the contact 3 extends beyond the insulating housing 2 through said gaps 220 of the barrier 22 for being soldered to the printed circuit board. So, the bars 25 with the barbs 251 and the bottom surface 201 of the insulating housing 2 sandwich the contact 3 to firmly retain the contact 3 in the insulating housing 2. Moreover, the protrusions 221 engaging with the notches 351 also can prevent the contact 3 from dropping.

The electrical card connector in present invention has a firm assembly relationship between the contacts and the insulating housing by forming a plurality of bars on lateral sides of the passageways, which prevents the contacts dropping from the insulating housing and improves the efficiency. However, while the preferred embodiment of the invention have been shown and described, it will apparent to those skilled in the art that changes and modifications may be made therein without departing from the spirit of the invention, the scope of which is defined by the appended claims.

What is claimed is:

1. An electrical card connector comprising:
   an insulating housing having a top surface, a bottom surface and a plurality of passageways running through the top surface and the bottom surface, the insulating housing formed with a plurality of bars downwardly protruding from the bottom surface;
   a plurality of contacts assembled into the insulating housing from bottom to top, each contact having a mating portion extending upwardly beyond the top surface of the insulating housing through the corresponding passageway, a soldering portion and a horizontal portion, at least one side of the horizontal portion being held by the bar;
   wherein each contact has two parallel horizontal portions, and said mating portion is formed between the two horizontal portions and extends along the horizontal portions, both horizontal portions are retained by the bars;
   wherein each contact comprises a rectangular base portion formed with the mating portion and the horizontal portion, and said soldering portion extends from the base portion; the base portion has a first engaging portion and a second engaging portion bended from two opposed lateral ends thereof;
   wherein the base portion has at least one engaging portion with a vertical portion at a lateral end thereof, the insulating housing defines a plurality of slots for receiving corresponding vertical portions;
   wherein the insulating housing is formed with a plurality of protrusions exposed in the slots, and the contact is provided with at least one notch on the vertical portion for engaging with the protrusions;
   wherein each bar formed on two sides of each passageway has a barb protruding toward the corresponding passageway for restricting the horizontal portion of the contact.

2. The electrical card connector as claimed in claim 1, wherein the insulating housing has a plurality of sustainers adjacent to the passageways for covering a part of each contact.

3. The electrical card connector as claimed in claim 1, wherein a spring portion is a spring arm punched from a center part of the base portion with an end near the first engaging portion linking with a planar portion of the base portion and the other end extending upwardly and laterally toward the second engaging portion.

4. The electrical card connector as claimed in claim 3, wherein said soldering portion and mating portion both extend toward a same lateral side of the engaging portion.

5. The electrical card connector as claimed in claim 1 the spring portion having a connecting portion linking with the planar portion and a mating portion extending from the connecting portion toward the second engaging portion.

6. The electrical card connector as claimed in claim 5, wherein each vertical portion has at least one projection projecting from a front or a rear sides of the vertical portion.

7. The electrical card connector as claimed in claim 5, wherein said soldering portion and mating portion extend respectively toward two opposed lateral sides of the engaging portion.

8. An electrical card connector comprising:
   an insulating housing having a top surface, a bottom surface and a plurality of passageways extending along a front-to-back direction; and
   a plurality of contacts respectively assembled to the corresponding passageways, each of said contacts essentially defining a horizontal frame having a resilient mating portion extending upwardly from an inner edge thereof and beyond the top surface, a soldering portion extending downwardly from an outer edge thereof around the bottom surface; wherein
   most portions of said frame are hidden under the top surface and unexposed upwardly to an exterior; wherein
   said mating portion extends from one end of the frame while the soldering portion extends from the other end of the frame oppositely, wherein said contact is assembled to the corresponding passageway from the bottom face upwardly, and the housing includes a deflectable bar with a barb engaged with the frame to lock the contact in position;

wherein the frame includes a pair of vertical plates extending downwardly from two opposite ends of the frame and received in corresponding grooves for retention; wherein said mating potion and the solder portion are essentially aligned with each other in the front-to-back direction.

9. The electrical card connector as claimed in claim 8, wherein the housing forms a sustainer corresponding to each of the passageways for protecting a joint region of the mating portion and the frame.

10. An electrical card connector comprising:

an insulating housing having a top surface, a bottom surface and a plurality of passageways extending along a front-to-back direction; and a plurality of contacts respectively assembled to the corresponding passageways, each of said contacts essentially defining a horizontal frame having a resilient mating portion extending upwardly from an inner edge thereof and beyond the top surface, a soldering portion extending downwardly from an outer edge thereof around the bottom surface; wherein most portions of said frame are hidden under the top surface and unexposed upwardly to an exterior; wherein said mating portion extends from one end of the frame while the soldering portion extends from the other end of the frame oppositely, wherein said contact is assembled to the corresponding passageway from the bottom face upwardly, and the housing includes a deflectable bar with a barb engaged with the frame to lock the contact in position;

wherein the frame includes a pair of vertical plates extending downwardly from two opposite ends of the frame and received in corresponding grooves for retention; wherein the housing forms a sustainer corresponding to each of the passageways for protecting a joint region of the mating portion and the frame.

* * * * *